US012505686B2

(12) United States Patent
Masuzawa et al.

(10) Patent No.: US 12,505,686 B2
(45) Date of Patent: Dec. 23, 2025

(54) IMAGE PROCESSING APPARATUS, METHOD, AND PROGRAM

(71) Applicant: FUJIFILM Corporation, Tokyo (JP)

(72) Inventors: Naoto Masuzawa, Tokyo (JP); Satoshi Ihara, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 399 days.

(21) Appl. No.: 18/145,835

(22) Filed: Dec. 22, 2022

(65) Prior Publication Data

US 2023/0206662 A1    Jun. 29, 2023

(30) Foreign Application Priority Data

Dec. 27, 2021    (JP) ................................. 2021-213438

(51) Int. Cl.
G06K 9/00        (2022.01)
G06T 7/00        (2017.01)
G06V 20/70       (2022.01)

(52) U.S. Cl.
CPC ............ *G06V 20/70* (2022.01); *G06T 7/0012* (2013.01); *G06T 2207/30012* (2013.01)

(58) Field of Classification Search
CPC ........ G06V 20/70; G06V 10/86; G06V 10/82; G06V 2201/033; G06T 7/0012; G06T 2207/30012; G06T 2207/10072; G06T 2207/20081; G06T 2207/20084; G06T 7/11; G06T 7/162
See application file for complete search history.

(56) References Cited

U.S. PATENT DOCUMENTS

| 8,014,625 B2 * | 9/2011 | Dewaele | G06T 7/35 348/580 |
| 8,384,735 B2 * | 2/2013 | Wang | G16H 30/40 345/619 |
| 8,463,010 B2 * | 6/2013 | Batman | G06T 19/00 382/128 |
| 8,625,869 B2 * | 1/2014 | Harder | G06T 15/08 382/131 |

(Continued)

FOREIGN PATENT DOCUMENTS

| CN | 104641397 A | * | 5/2015 | ........... A61B 5/4566 |
| CN | 105338902 A | * | 2/2016 | ............. A61B 5/107 |

(Continued)

OTHER PUBLICATIONS

Naoto Masuzawa et al., "Automatic Segmentation, Localization, and Identication of Vertebrae in 3D CT Images Using Cascaded Convolutional Neural Networks," arXiv:2009.13798v1, Sep. 2020, pp. 1-9.

(Continued)

*Primary Examiner* — Shervin K Nakhjavan
(74) *Attorney, Agent, or Firm* — JCIPRNET

(57) ABSTRACT

A processor extracts, from an image including a plurality of structures that spatially continuously present and whose corresponding labels have a hierarchy, respective key points of the plurality of structures in association with labels of a first layer; uses the key points as nodes to derive a graph structure in which the labels of the first layer are associated with the nodes; and associates the nodes with labels of a second layer lower than the first layer by analyzing the graph structure.

9 Claims, 15 Drawing Sheets

(56) References Cited

U.S. PATENT DOCUMENTS

| | | | | |
|---|---|---|---|---|
| 8,958,614 B2* | 2/2015 | Zhan | ............ | G06T 7/73 |
| | | | | 382/128 |
| 9,020,235 B2* | 4/2015 | Krishnan | ............ | A61B 6/469 |
| | | | | 382/132 |
| 9,196,035 B2* | 11/2015 | Weiss | ............ | A61B 5/0263 |
| 9,491,415 B2* | 11/2016 | Deitz | ............ | A61B 34/20 |
| 9,561,004 B2* | 2/2017 | Forsberg | ............ | G16H 50/50 |
| 9,928,448 B1* | 3/2018 | Merler | ............ | G06V 20/35 |
| 10,039,513 B2* | 8/2018 | Bregman-Amitai | ... | A61B 6/481 |
| 11,288,542 B1* | 3/2022 | Samplawski | ............ | G06N 3/08 |
| 11,475,799 B2* | 10/2022 | Owens, Jr. | ............ | G09B 23/32 |
| 11,557,150 B2 | 1/2023 | Kraft et al. | | |
| 11,704,798 B2* | 7/2023 | Miao | ............ | G06T 7/73 |
| | | | | 382/128 |
| 12,154,691 B2* | 11/2024 | Crawford | ............ | G16H 50/20 |
| 12,161,421 B2* | 12/2024 | Yardibi | ............ | A61B 90/37 |
| 12,314,345 B2 | 5/2025 | Keshwani | | |
| 2017/0287130 A1 | 10/2017 | Ihara | | |

FOREIGN PATENT DOCUMENTS

| | | | | | |
|---|---|---|---|---|---|
| CN | 110111337 A | * | 8/2019 | ............ | G06T 7/11 |
| JP | 2015530155 A | * | 10/2015 | ............ | G16H 50/30 |
| JP | 2017187824 | | 10/2017 | | |
| JP | 2020533662 | | 11/2020 | | |
| JP | 2021034015 | | 3/2021 | | |
| WO | 2020262682 | | 12/2020 | | |

OTHER PUBLICATIONS

"Office Action of Japan Counterpart Application", issued on May 13, 2025, with English translation thereof, pp. 1-6.

* cited by examiner

FIG. 8
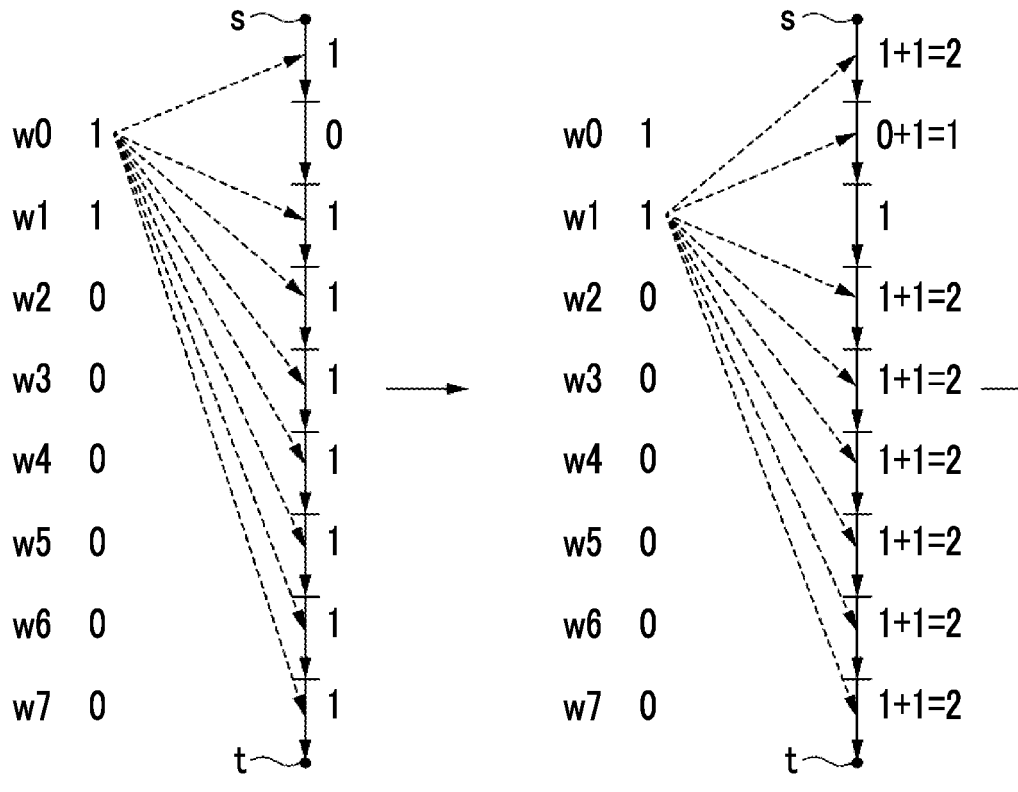
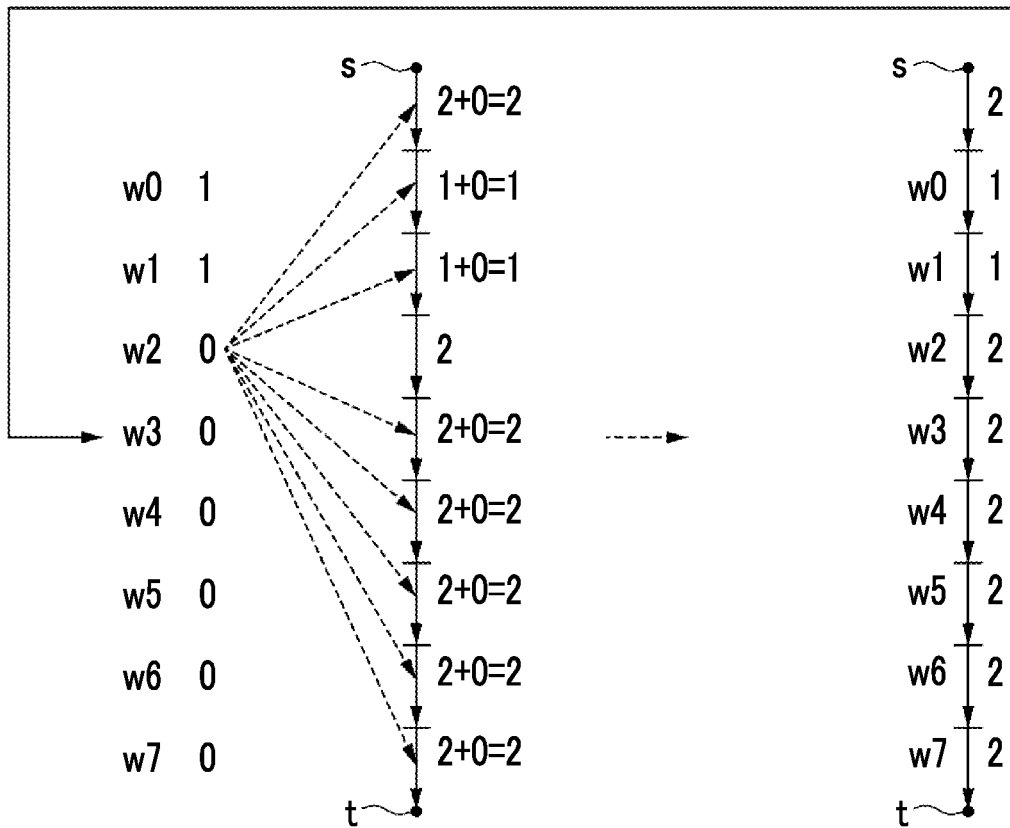

FIG. 9
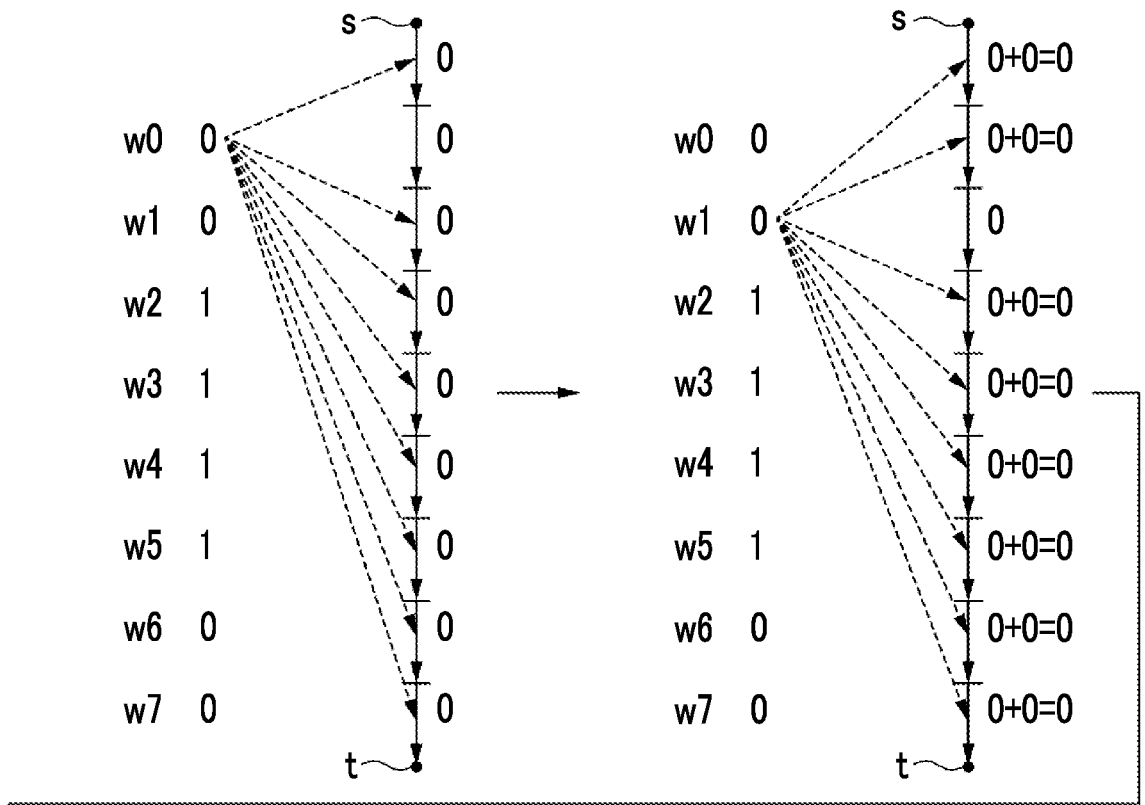
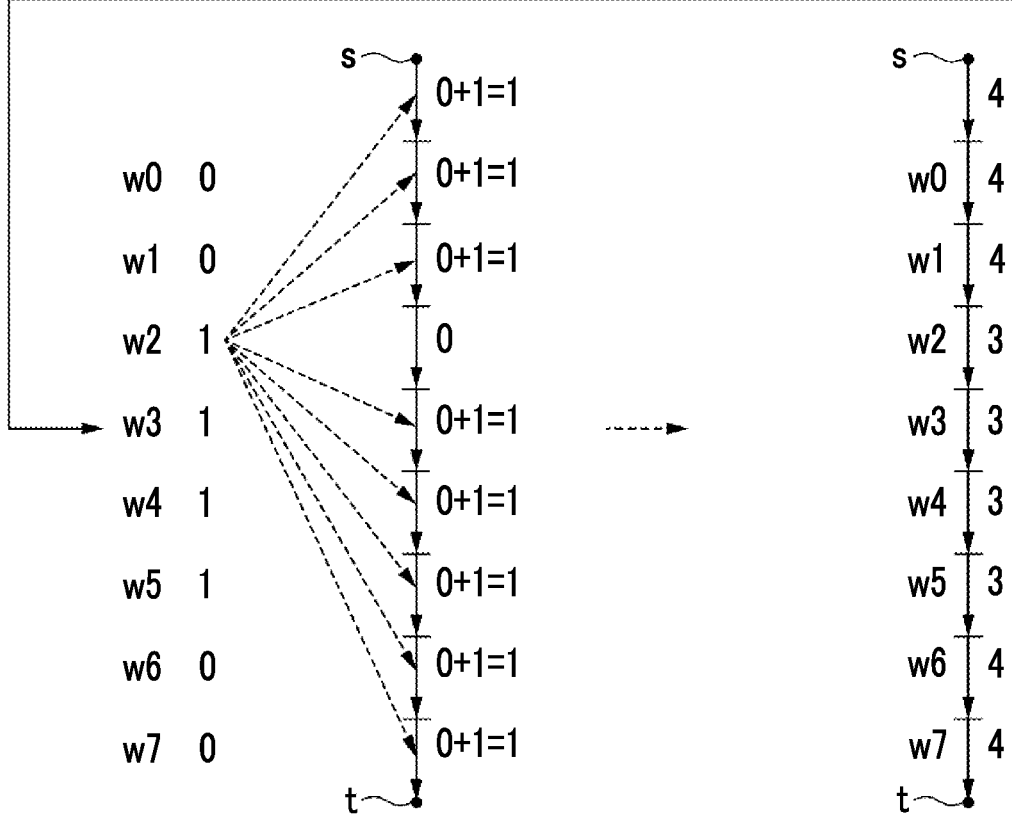

IMAGE PROCESSING APPARATUS, METHOD, AND PROGRAM

CROSS REFERENCE TO RELATED APPLICATIONS

The present application claims priority from Japanese Patent Application No. 2021-213438 filed on Dec. 27, 2021, the entire disclosure of which is incorporated herein by reference.

BACKGROUND

Technical Field

The present disclosure relates to an image processing apparatus, method, and program.

Related Art

A spinal cord plays a role of transmitting a message to and from each part of the brain and the body, and is a very important part. Therefore, the spinal cord is protected by a spine consisting of a plurality of vertebrae. On the other hand, the presence or absence of lesions such as damage and cancer metastasis in the vertebra constituting such a spine is checked by interpreting a tomographic image of a subject. At the time of interpretation, it is necessary to identify each vertebra in order to specify the vertebrae having damage and lesions. Therefore, various image processing algorithms have been proposed in which a tomographic image of a subject is acquired, a plurality of vertebrae are separated and recognized based on the acquired tomographic image, and a label is given to each vertebra.

For example, in Naoto Masuzawa, et. al, Automatic Segmentation, Localization, and Identification of Vertebrae in 3D CT Images Using Cascaded Convolutional Neural Networks, MICCAI 2020, pp. 681-690, a method has been proposed in which a spine in a three-dimensional image such as a computed tomography (CT) image or a magnetic resonance imaging (MRI) image is separated into a cervical spine, a thoracic spine, and a lumbar spine and extracted, then an output is reflected in an input, and a convolutional neural network having a mechanism for recursively extracting vertebrae is used to regionally extract and label individual vertebrae included in the cervical spine, the thoracic spine, and the lumbar spine one by one.

In the method described in Naoto Masuzawa, et. al, Automatic Segmentation, Localization, and Identification of Vertebrae in 3D CT Images Using Cascaded Convolutional Neural Networks, MICCAI 2020, pp. 681-690, individual vertebrae included in the cervical spine, the thoracic spine, and the lumbar spine are recursively extracted one by one. Therefore, in a case where an error is made in the extraction processing, the error affects the subsequent extraction processing, and thus it becomes difficult to accurately label the vertebra.

SUMMARY OF THE INVENTION

The present disclosure has been made in view of the above circumstances, and an object of the present disclosure is to enable accurate labeling of a plurality of structures such as vertebrae included in an image.

According to an aspect of the present disclosure, there is provided an image processing apparatus comprising at least one processor, in which the processor is configured to: extract, from an image including a plurality of structures that spatially continuously present and whose corresponding labels have a hierarchy, respective key points of the plurality of structures in association with labels of a first layer; use the key points as nodes to derive a graph structure in which the labels of the first layer are associated with the nodes; and associate the nodes with labels of a second layer lower than the first layer by analyzing the graph structure.

In the image processing apparatus according to the aspect of the present disclosure, the plurality of structures may include a plurality of vertebrae, the labels of the first layer may be at least one of a cervical spine, a thoracic spine, or a lumbar spine, and the labels of the second layer may be labels for identifying individual bones in at least one of the cervical spine, the thoracic spine, or the lumbar spine.

In addition, in the image processing apparatus according to the aspect of the present disclosure, the plurality of structures may include a plurality of ribs, the labels of the first layer may be the ribs, and the labels of the second layer may be labels for identifying the individual ribs.

In this case, the labels of the second layer may be labels for identifying a left first rib to a left twelfth rib and a right first rib to a right twelfth rib.

In addition, in the image processing apparatus according to the aspect of the present disclosure, the processor may be configured to analyze the graph structure such that a link to be cut in the graph structure is determined by a graph cut method and the labels of the second layer to be associated with the respective nodes are determined.

In addition, in the image processing apparatus according to the aspect of the present disclosure, the processor may be configured to extract the plurality of structures associated with the labels of the second layer.

In addition, in the image processing apparatus according to the aspect of the present disclosure, the processor may be configured to display the labels of the second layer.

In addition, in the image processing apparatus according to the aspect of the present disclosure, the processor may be configured to display the plurality of extracted structures in association with the labels of the second layer.

According to an aspect of the present disclosure, there is provided an image processing method comprising: extracting, from an image including a plurality of structures that spatially continuously present and whose corresponding labels have a hierarchy, respective key points of the plurality of structures in association with labels of a first layer; using the key points as nodes to derive a graph structure in which the labels of the first layer are associated with the nodes; and associating the nodes with labels of a second layer lower than the first layer by analyzing the graph structure.

According to an aspect of the present disclosure, there is provided an image processing program causing a computer to execute: a procedure of extracting, from an image including a plurality of structures that spatially continuously present and whose corresponding labels have a hierarchy, respective key points of the plurality of structures in association with labels of a first layer; a procedure of using the key points as nodes to derive a graph structure in which the labels of the first layer are associated with the nodes; and a procedure of associating the nodes with labels of a second layer lower than the first layer by analyzing the graph structure.

According to the aspects of the present disclosure, a plurality of structures included in an image can be labeled with high accuracy.

BRIEF DESCRIPTION OF THE DRAWINGS

FIG. 8 is a diagram illustrating the setting of weights.

FIG. 9 is a diagram illustrating the setting of weights.

DETAILED DESCRIPTION

Figure 1:
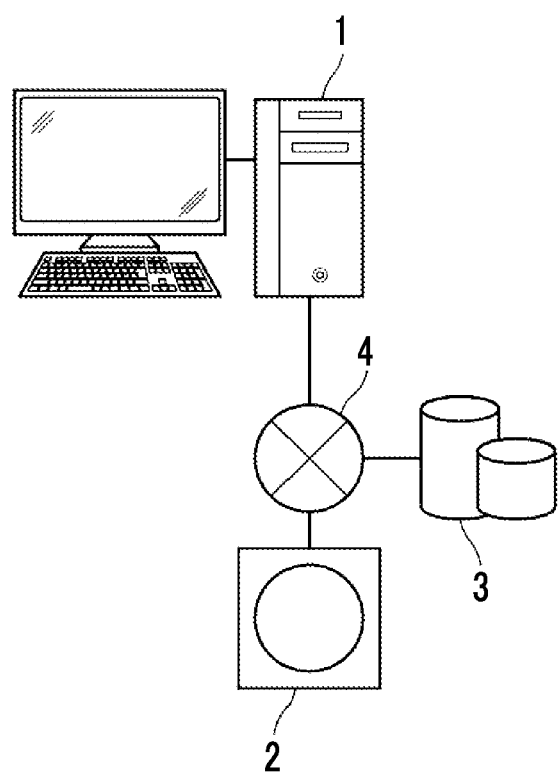
FIG. 1 is a diagram showing a schematic configuration of a medical information system to which an image processing apparatus according to an embodiment of the present disclosure is applied.

Hereinafter, an embodiment of the present disclosure will be described with reference to the drawings. First, a configuration of a medical information system to which an image processing apparatus according to the present embodiment is applied will be described. FIG. 1 is a diagram showing a schematic configuration of the medical information system. In the medical information system shown in FIG. 1, a computer 1 encompassing an image processing apparatus according to the present embodiment, an imaging apparatus 2, and an image storage server 3 are connected via a network 4 in a communicable state.

The computer 1 encompasses an image processing apparatus according to the present embodiment, and an image processing program according to the present embodiment is installed in the computer 1. The computer 1 may be a workstation or a personal computer directly operated by a doctor performing the diagnosis, or may be a server computer connected to a workstation and a personal computer via a network. The image processing program is stored in a storage apparatus of a server computer connected to the network or in a network storage in a state in which it can be accessed from the outside, and is downloaded to and installed on the computer 1 used by a doctor in response to a request. Alternatively, the image processing program is recorded on a recording medium, such as a digital versatile disc (DVD) or a compact disc read only memory (CD-ROM), and distributed, and is installed on the computer 1 from the recording medium.

The imaging apparatus 2 is an apparatus that generates a three-dimensional image representing diagnosis target parts of a subject by imaging the part, and is, specifically, the imaging apparatus 2 is a CT apparatus, an MRI apparatus, a positron emission tomography (PET) apparatus, and the like. A three-dimensional image consisting of a plurality of tomographic images generated by the imaging apparatus 2 is transmitted to and saved in the image storage server 3. In the present embodiment, the diagnosis target parts of the subject are a spine and ribs, the imaging apparatus 2 is a CT apparatus, and a CT image including the spine and the ribs of the subject is generated as a three-dimensional image.

The image storage server 3 is a computer that saves and manages various types of data, and includes a large-capacity external storage apparatus and database management software. The image storage server 3 communicates with another apparatus via the wired or wireless network 4, and transmits/receives image data or the like. Specifically, various types of data including image data of a three-dimensional image generated by the imaging apparatus 2 are acquired via a network and saved in a recording medium such as a large-capacity external storage apparatus and managed. The storage format of the image data and the communication between the respective apparatuses via the network 4 are based on a protocol such as digital imaging and communication in medicine (DICOM).

Figure 2:
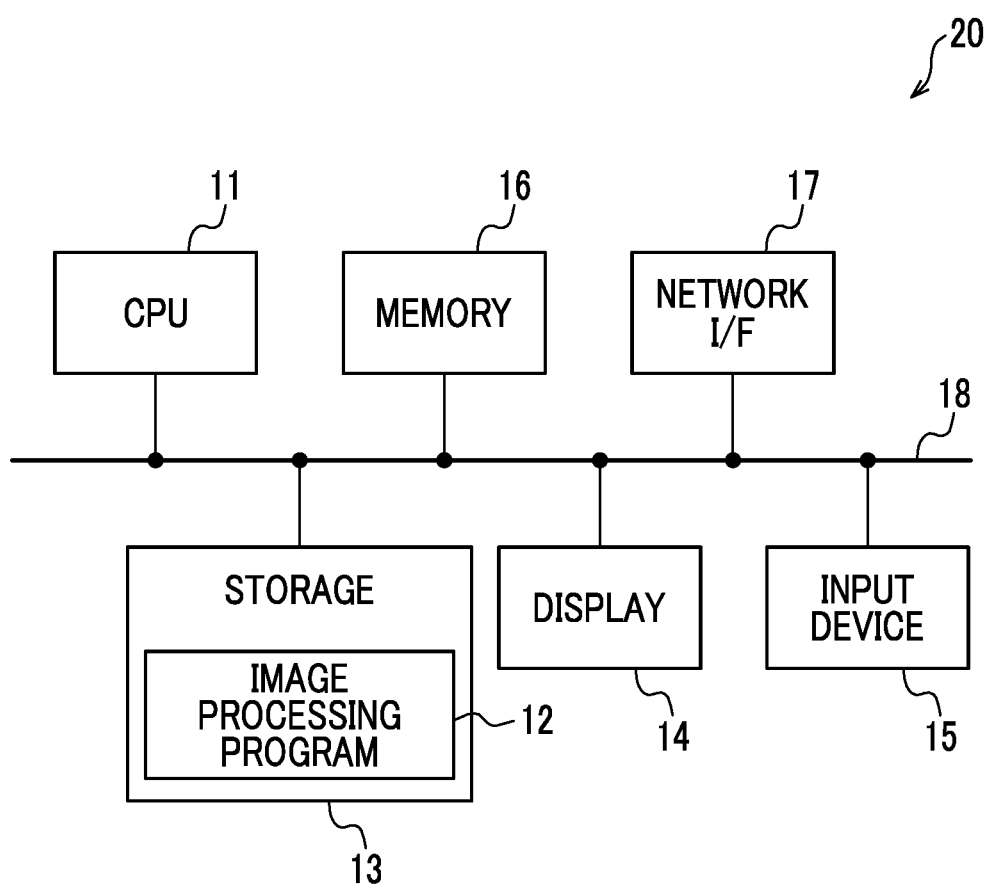
FIG. 2 is a diagram showing a schematic configuration of the image processing apparatus according to the present embodiment.

Next, the image processing apparatus according to the present embodiment will be described. FIG. 2 is a diagram showing a hardware configuration of the image processing apparatus according to the present embodiment. As shown in FIG. 2, the image processing apparatus 20 includes a central processing unit (CPU) 11, a non-volatile storage 13, and a memory 16 as a temporary storage area. Further, the image processing apparatus 20 includes a display 14 such as a liquid crystal display, an input device 15 such as a keyboard and a mouse, and a network interface (I/F) 17 connected to the network 4. The CPU 11, the storage 13, the display 14, the input device 15, the memory 16, and the network I/F 17 are connected to a bus 18. The CPU 11 is an example of a processor in the present disclosure.

The storage 13 is realized by a hard disk drive (HDD), a solid state drive (SSD), a flash memory, and the like. An image processing program 12 is stored in the storage 13 as the storage medium. The CPU 11 reads the image processing program 12 from the storage 13, loads the read program into the memory 16, and executes the loaded image processing program 12.

Figure 3:
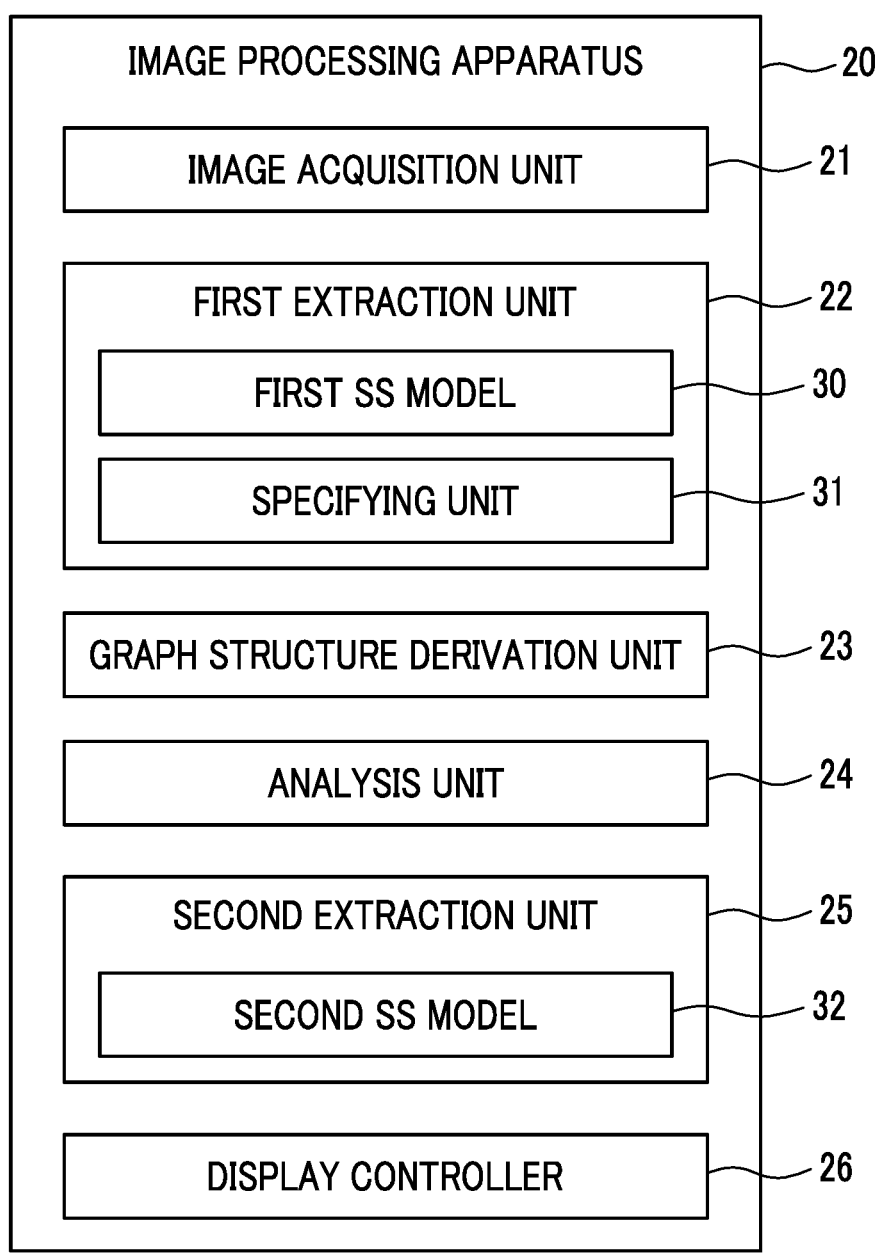
FIG. 3 is a functional configuration diagram of the image processing apparatus according to the present embodiment.

Next, a functional configuration of the image processing apparatus according to the present embodiment will be described. FIG. 3 is a diagram showing a functional configuration of the image processing apparatus according to the present embodiment. As shown in FIG. 3, the image processing apparatus 20 comprises an image acquisition unit 21, a first extraction unit 22, a graph structure derivation unit 23, an analysis unit 24, a second extraction unit 25, and a display controller 26. Then, as the CPU 11 executes the image processing program 12, the CPU 11 functions as the image acquisition unit 21, the first extraction unit 22, the graph structure derivation unit 23, the analysis unit 24, the second extraction unit 25, and the display controller 26.

The image acquisition unit 21 acquires a target image G0 to be processed from the image storage server 3 in response to an instruction from the input device 15 provided by an operator. In the present embodiment, the target image G0 is a CT image including the spine and ribs of the human body as described above. The target image G0 is an example of an image of the present disclosure.

Preprocessing may be performed on the target image G0. Examples of the preprocessing include processing such as normalization of spatial spacing different for each target image, normalization of brightness values, and reduction of noise by a smoothing filter. The spatial spacing normalization processing is processing of matching an image size for each pixel and a pixel interval, which are different for each target image, between the images to be processed. The brightness value normalization processing is processing of matching different brightness values for each target image between the images. Specific examples thereof include processing of matching the average value of the brightness values. The preprocessing may be performed by the image acquisition unit 21 or the first extraction unit 22.

The spine includes a plurality of vertebrae. Each vertebra is anatomically labeled. Here, the spine consists of four parts: a cervical spine, a thoracic spine, a lumbar spine, and a sacral bone. The cervical spine consists of seven vertebrae and is anatomically labeled with C1 to C7. The thoracic spine consists of 12 vertebrae and is anatomically labeled with T1 to T12. The lumbar spine consists of 5 vertebrae and is anatomically labeled with L1 to L5. The sacral bone consists of only one bone and is anatomically labeled with S1. In the following description, the vertebrae targeted by the present embodiment are the cervical spine, the thoracic spine, and the lumbar spine, and the sacral bone is excluded.

The ribs are arched bones extending from the thoracic spine constituting the vertebrae to the left and right. The ribs correspond to each of the 12 vertebrae included in the thoracic spine, and consist of twelve ribs on each side of the left and right. Therefore, the ribs can be anatomically labeled with a right first rib R1 to a right twelfth rib R12 and a left first rib R1 to a left twelfth rib R12.

The vertebrae can be labeled with cervical spines, thoracic spines, and lumbar spines, and the cervical spines, the thoracic spines, and the lumbar spines can be associated with labels of a first cervical spine C1 to a seventh cervical spine C7, a first thoracic spine T1 to a twelfth thoracic spine T12, and a first lumbar spine L1 to a fifth lumbar spine L5, respectively. In addition, the ribs can be associated with labels of the ribs, and can be associated with labels of the right first rib R1 to the right twelfth rib R12 and the left first rib R1 to the left twelfth rib R12. Accordingly, the vertebrae and the ribs are examples of a plurality of structures that are spatially continuously present and whose corresponding labels have a hierarchy in the present disclosure. Further, the cervical spines, the thoracic spines, the lumbar spines, and the ribs are examples of labels of a first layer. In addition, the first cervical spine C1 to the seventh cervical spine C7, the first thoracic spine T1 to the twelfth thoracic spine T12, the first lumbar spine L1 to the fifth lumbar spine L5, the right first rib R1 to the right twelfth rib R12, and the left first rib R1 to the left twelfth rib R12 are examples of labels of a second layer.

The image processing apparatus according to the present embodiment performs labeling by associating the vertebrae included in the target image G0 with labels of seven cervical spines, 12 thoracic spines, and five lumbar spines, respectively. In addition, labeling is performed by associating the labels of the right first rib R1 to the right twelfth rib R12 and the left first rib R1 to the left twelfth rib R12 with the ribs.

The first extraction unit 22 extracts respective key points of the plurality of vertebrae and the plurality of ribs from the target image G0 in association with labels of the first layer. Specifically, the first extraction unit 22 extracts the key points of the plurality of vertebrae in association with the labels of the cervical spine, the thoracic spine, and the lumbar spine, and extracts the key points of the plurality of ribs in association with the labels of the ribs. To this end, the first extraction unit 22 includes a semantic segmentation model (hereinafter referred to as a first SS model) 30 for point extraction and a specifying unit 31.

In the present embodiment, the first extraction unit 22 extracts a point in each vertebra and a center point in each rib included in the target image G0 as key points. Here, the centroid of a vertebral body constituting the vertebra is extracted as the center point in the vertebra, and a plurality of points on the center line of the rib as the center point in the rib are extracted as key points. The center line of the rib means a line connecting the centers (centroids) of a plurality of cross sections intersecting the longitudinal direction of the rib. In addition, since the line is formed by arranging points continuously, in the following description, a point on the center line of the rib is referred to as a center point of the rib.

The first extraction unit 22 uses the first SS model 30 to output a probability distribution map representing existence probabilities of the center points of the cervical spine, the thoracic spine, the lumbar spine, and the ribs in the target image G0. The probability distribution map has elements corresponding to each pixel of the target image G0 on a one-to-one basis, and is data in which combinations of an existence probability of the center point of the cervical spine, an existence probability of the center point of the thoracic spine, an existence probability of the center point of the lumbar spine, an existence probability of the center points of the ribs, and a non-existence probability are registered as element values of each element. The non-existence probability is a probability that no center point of any of the cervical spine, the thoracic spine, the lumbar spine, and the ribs is present. For example, an element value of (1.0, 0, 0, 0, 0) indicates that the existence probability of the center point of the cervical spine is 100%, the existence probability of the center point of the thoracic spine is 0%, the existence probability of the center point of the lumbar spine is 0%, the existence probability of the center points of the ribs is 0%, and the non-existence probability is 0%.

The first SS model 30 is constructed by a convolutional neural network (hereinafter abbreviated as a convolutional neural network (CNN)). Examples of the CNN include a U-Net and a residual network (ResNet). Specifically, in a case where a three-dimensional CT image including the vertebrae and the ribs is input, the first SS model 30 is constructed by machine learning a CNN such that a probability distribution map representing the existence probabilities extracting the center point of the cervical spine, the center point of the thoracic spine, the center point of the lumbar spine, and the center points of the ribs included in the target image G0 is output.

Figure 4:
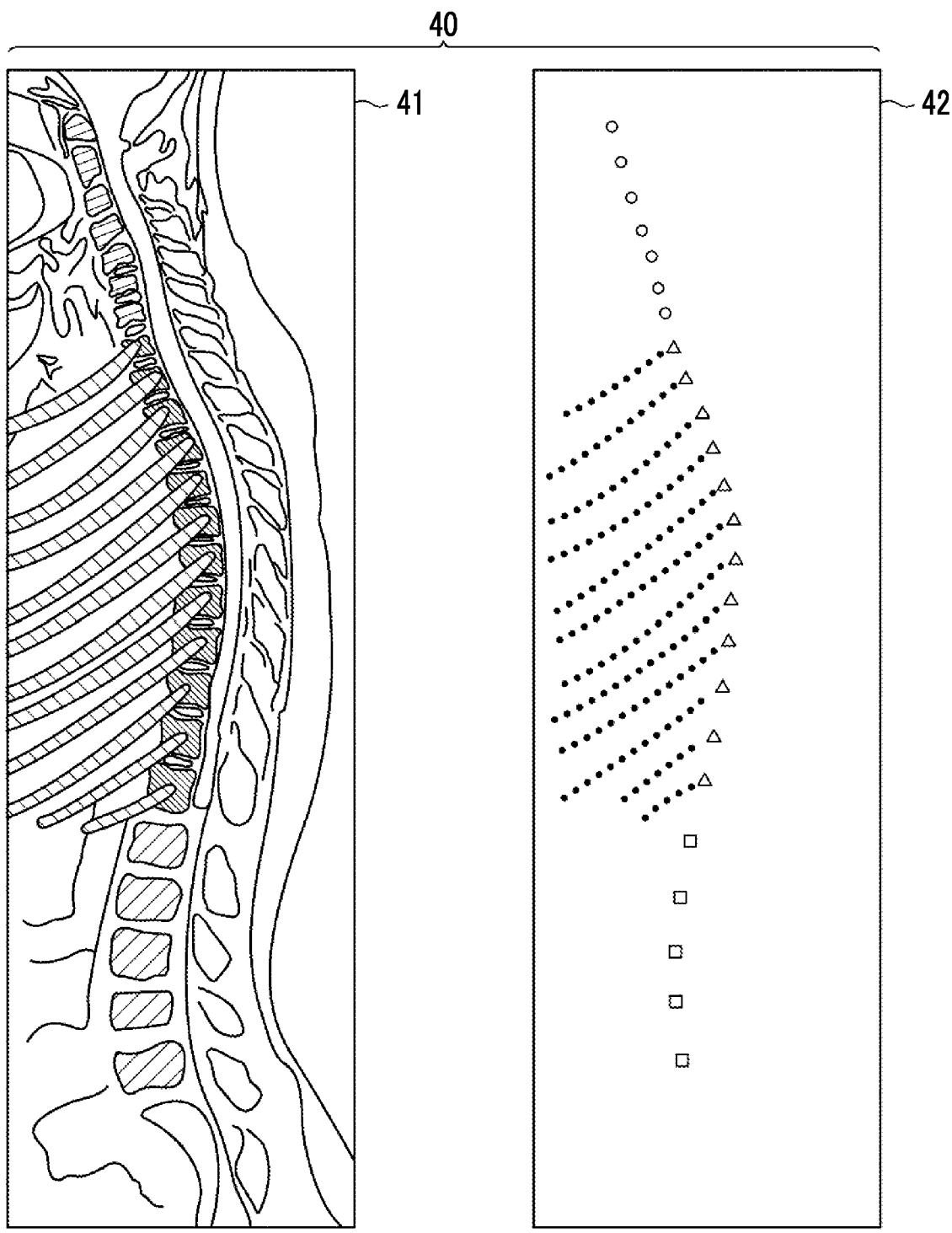
FIG. 4 is a diagram showing an example of training data for constructing a first SS model.

The first SS model 30 is constructed by training the CNN using training data. FIG. 4 is a diagram showing an example of training data for constructing the first SS model. As shown in FIG. 4, training data 40 includes a training CT image 41 including the ribs and the vertebrae and correct answer data 42. The training CT image 41 is a three-dimensional image, and FIG. 4 shows a tomographic image of a sagittal cross section. The sagittal cross section including the vertebrae does not include the ribs, but in FIG. 4, the ribs are shown for the sake of description.

The correct answer data 42 is an image in which the center point of the vertebral body and the center points of the ribs constituting the vertebra are specified together with the label in the training CT image 41. For example, in the correct answer data 42, a label 1 is given to a pixel corresponding to the center point of the vertebral body constituting the cervical spine, a label 2 is given to a pixel corresponding to the center point of the vertebral body constituting the thoracic spine, a label 3 is given to a pixel corresponding to the center point of the vertebral body constituting the lumbar spine, and a label 4 is given to a pixel corresponding to the center point of the rib. In FIG. 4, the label 1 is indicated by a white circle, the label 2 is indicated by a white triangle, the label 3 is indicated by a white square, and the label 4 is indicated by a black circle. Although the ribs are present on the left and right sides of the human body, the training CT image 41 in FIG. 4 shows only the ribs on the left side of the human body, and the correct answer data 42 shows only the center points of the left ribs on the left side of the human body.

At the time of training, the training CT image 41 is input to the first SS model 30. The first SS model 30 outputs a training probability distribution map for the training CT image 41. Also, the loss calculation of the first SS model 30 is performed based on the training probability distribution map and the correct answer data 42. Then, various coefficients of the first SS model 30 are updated according to the result of the loss calculation, and the first SS model 30 is updated according to the updated setting.

At the time of training the first SS model 30, a series of processes of the input of the training CT image 41 to the first SS model 30, the output of the training probability distribution map from the first SS model 30, the loss calculation, the update setting, and the update of the first SS model 30 are repeatedly performed while the training data 40 is exchanged. The repetition of the series of processes ends in a case where the prediction accuracy of the training probability distribution map for the correct answer data 42 reaches a predetermined set level. The first SS model 30 whose prediction accuracy has reached the set level in this manner is stored in the storage 13 and used in the first extraction unit 22.

In the probability distribution map output by the first SS model 30, the specifying unit 31 extracts an element whose existence probability of the center point of the cervical spine is equal to or greater than a predetermined threshold value (for example, 0.9) as the center point of the cervical spine, that is, the key point of the cervical spine, and specifies the position coordinates of the center point of the cervical spine in the target image G0. Further, in the probability distribution map output by the first SS model 30, the specifying unit 31 extracts an element whose existence probability of the center point of the thoracic spine is equal to or greater than a predetermined threshold value (for example, 0.9) as the center point of the thoracic spine, that is, the key point of the thoracic spine, and specifies the position coordinates of the center point of the thoracic spine in the target image G0. Further, in the probability distribution map output by the first SS model 30, the specifying unit 31 extracts an element whose existence probability of the center point of the lumbar spine is equal to or greater than a predetermined threshold value (for example, 0.9) as the center point of the lumbar spine, that is, the key point of the lumbar spine, and specifies the position coordinates of the center point of the lumbar spine in the target image G0. Further, in the probability distribution map output by the first SS model 30, the specifying unit 31 extracts an element whose existence probability of the center point of the ribs is equal to or greater than a predetermined threshold value (for example, 0.9) as the center point of the ribs, that is, the key point of the ribs, and specifies the position coordinates of the center points of the ribs in the target image G0. Since the center points of the ribs are adjacent to each other in the target image G0, they may be specified as lines.

Figure 5:
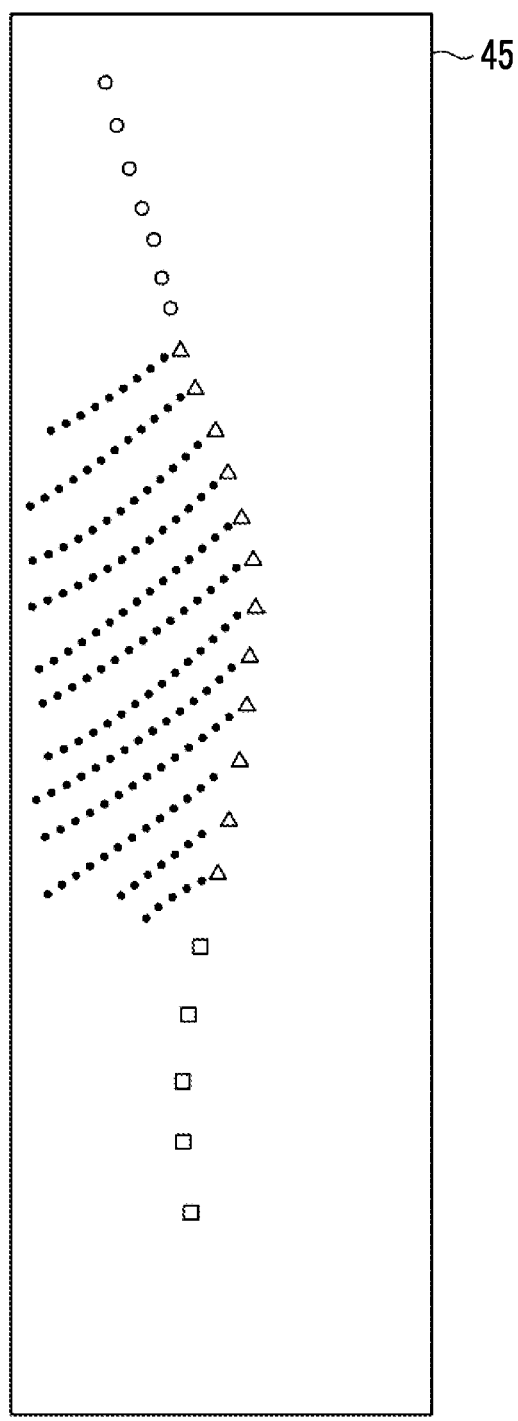
FIG. 5 is a diagram showing a key point map.

FIG. 5 is a diagram showing a key point map which is a result of extracting key points from the target image G0. In a key point map 45 shown in FIG. 5, the center point of the cervical spine extracted from the target image G0 is indicated by a white circle, the center point of the thoracic spine is indicated by a white triangle, the center point of the lumbar spine is indicated by a white square, and the center point of the rib is indicated by a black circle.

Note that each of the key points extracted by the first extraction unit 22 has a feature amount. The feature amount includes information indicating that the key point is any one of the cervical spine, the thoracic spine, the lumbar spine, and the ribs, and the position coordinates of the key point in the target image G0. For example, information indicating that the key point is the cervical spine, information indicating that the key point is the thoracic spine, information indicating that the key point is the lumbar spine, and information indicating that the key point is the ribs are (1, 0, 0, 0), (0, 1, 0, 0), (0, 0, 1, 0), and (0, 0, 0, 1), respectively.

In the graph structure derivation unit 23, the first extraction unit 22 uses the key points extracted from the target image G0 as nodes to derive a graph structure in which the labels of the key points and the nodes are associated with each other. Here, the vertebrae are arranged in the order of the cervical spine, the thoracic spine, and the lumbar spine from the head side. The graph structure derivation unit 23 links the key points labeled with the cervical spine, the thoracic spine, and the lumbar spine only to the key points within a predetermined distance in the body axis direction of the human body. Accordingly, the graph structure derivation unit 23 derives the graph structure by regarding the key points labeled with the cervical spine, the thoracic spine, and the lumbar spine as a plurality of connected elements. On the other hand, regarding the ribs, the graph structure derivation unit 23 derives the graph structure by linking only the key point closest to the key point of the thoracic spine in the anterior-posterior direction of the human body. Accordingly, a graph structure for each of the left rib and the right rib is derived.

Figure 6:
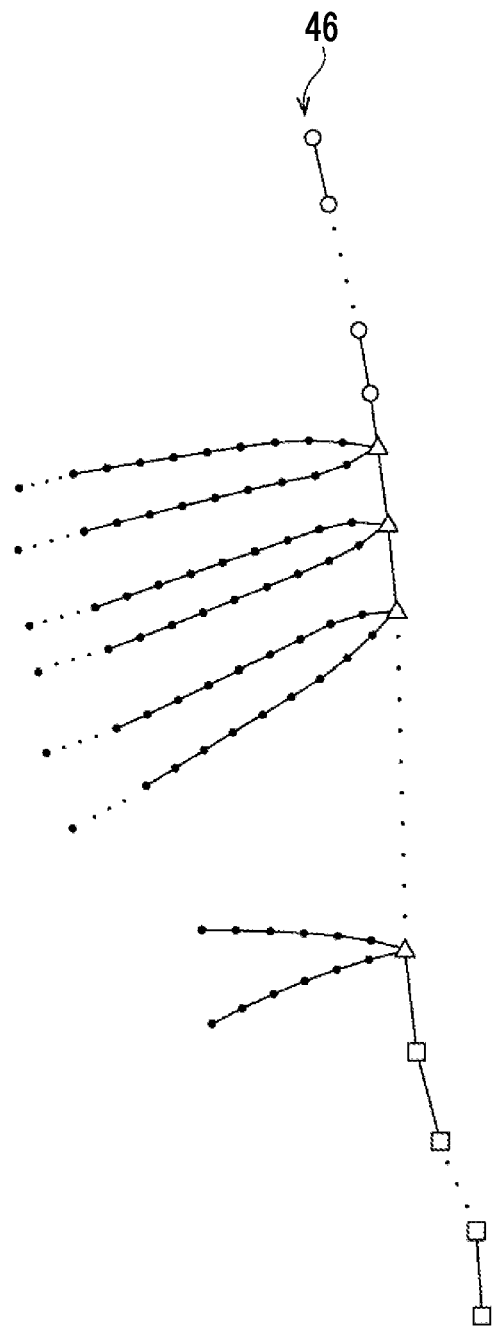
FIG. 6 is a perspective view of a key point illustrating the derivation of a graph structure.

FIG. 6 is a perspective view showing a graph structure. In a graph structure 46 shown in FIG. 6, the key points of the vertebrae are linked only to the adjacent key points, but may be linked to the next higher vertebra depending on the method of selecting a predetermined distance. Further, in the graph structure 46, the key points of the ribs are linked only to the key points in the direction intersecting the body axis of the human body, but may be linked to the key points of the ribs arranged in the body axis direction. Further, in FIG. 6, some nodes and some links are omitted.

The analysis unit 24 analyzes the graph structure derived by the graph structure derivation unit 23 to associate the nodes in the graph structure with the labels of the second layer lower than the first layer. To this end, the analysis unit 24 analyzes the graph structure 46 such that a link to be cut in the graph structure 46 is determined by a graph cut method and the labels of the second layer to be associated with the respective nodes in the graph structure 46 are determined. That is, the analysis unit analyzes the graph structure 46 such that the labels of the first cervical spine C1 to the seventh cervical spine C7 are associated with the nodes corresponding to the key points of the cervical spines, the labels of the first thoracic spine T1 to the twelfth thoracic spine T12 are associated with the nodes corresponding to the key points of the thoracic spines, the labels of the first lumbar spine L1 to the fifth lumbar spine L5 are associated with the nodes corresponding to the key points of the lumbar spines, and the labels of the right first rib R1 to the right twelfth rib R12 and the left first rib R1 to the left twelfth rib R12 are associated with the nodes corresponding to the key points of the ribs. Accordingly, the extracted key points are labeled with the labels of the second layer.

In the present embodiment, the analysis unit 24 determines the link to be cut in the graph structure by using, for example, the method described in JP2017-187824A. The method described in JP2017-187824A is a method of classifying N elements into one of N labels with a specific order in a case where N (N>2) elements are arranged in a specific order from 0 to N−1 in a predetermined direction.

Figure 7:
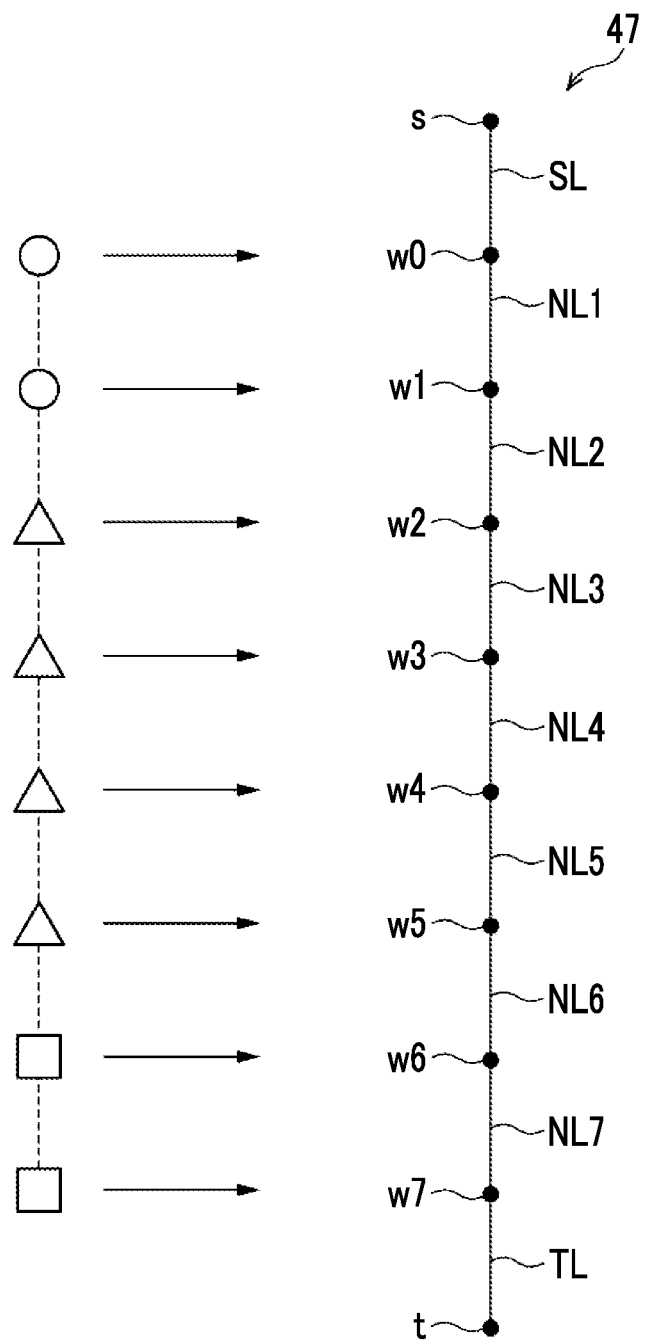
FIG. 7 is a diagram illustrating the generation of a graph.

The analysis unit 24 applies the method described in JP2017-187824A to dispose a reference node s and a node t with respect to the graph structure 46, to dispose a node w corresponding to the key point between the node s and the node t, and to generate a graph in which each node is linked. FIG. 7 is a diagram illustrating the generation of a graph. Here, for the sake of brevity, the number of the cervical spines, the thoracic spines, and the lumbar spines is assumed to be 2, 4, or 2, respectively. As shown in FIG. 7, the analysis unit 24 defines nodes w0 and w1 corresponding to two cervical spines, nodes w2 to w5 corresponding to four thoracic spines, and nodes w6 and w7 corresponding to two lumbar spines between the reference node s and node t. Further, an s-link SL is defined between the node s and the node w1, and a t-link TL is defined between the node w7 and the node t. In addition, n-links NL1 to NL7 are defined between the nodes w0 to w7. The nodes w0 to w7 correspond to the n-links NL1 to NL7 and the t-link TL, respectively. In this way, the analysis unit 24 generates a graph 47.

Also, the analysis unit 24 sets a smaller weight for the link corresponding to a node having the highest score in each node with respect to the s-link, the t-link, and the n-link in the direction from the head to the tail in the body axis direction (hereinafter referred to as a first direction). Further, the analysis unit 24 sets a weight for restricting cutting, as will be described later. Also, by executing graph cut processing on the graph for which the weight is set, the link to be cut among the s-link, the t-link, and the n-link is determined, and the plurality of nodes, that is, the key points, are associated with the labels.

Hereinafter, the setting of the weight will be described. In the present embodiment, weights are set for a plurality of links in the graph structure. Specifically, the weight is set by adding the scores for all the nodes to the weights of links other than the links corresponding to the nodes. FIG. 8 is a diagram illustrating the setting of the weight. In addition, here, the setting of the weight will be described using the graph generated as shown in FIG. 7.

In the present embodiment, information indicating that each key point, that is, the node, is the cervical spine, information indicating that each key point, that is, the node, is the thoracic spine, and information indicating that each key point, that is, the node, is the lumbar spine, are used as scores. That is, as a key point having information indicating that it is the cervical spine as a feature amount, the score of being the cervical spine is 1 and the score of being the thoracic spine and the lumbar spine is 0. As a key point having information indicating that it is the thoracic spine as a feature amount, the score of being the cervical spine is 0, the score of being the thoracic spine is 1, and the score of being the lumbar spine is 0. As a key point having information indicating that it is the lumbar spine as a feature amount, the score of being the cervical spine and the thoracic spine is 0, and the score of being the lumbar spine is 1.

First, the setting of the weight of the link with respect to the cervical spine will be described. FIG. 8 is a diagram illustrating the setting of the weight of the link with respect to the cervical spine. Here, the information indicating that the key point is the cervical spine as described above is (1, 0, 0, 0) for the cervical spine, the thoracic spine, the lumbar spine, and the ribs. Therefore, the scores of the nodes w0 to w7 are (1, 1, 0, 0, 0, 0, 0, 0).

Since the score of the first node w0 is 1, 1 is added to the weight of the s-link SL, the score of the node w0 is not added to the weight of the n-link NL1 corresponding to the node w0, and a score of 1 is added to the weights of the n-links NL2 to NL7 corresponding to the nodes w1 to w6 and the weight of the t-link TL corresponding to the node w7. Accordingly, the weights of the s-link SL, the n-links NL1 to NL7, and the t-link TL are (1, 0, 1, 1, 1, 1, 1, 1, 1).

Next, since the score of the node w1 is 1, 1 of the score of the node w1 is added to the weight of the s-link SL, and 1 of the score of the node w1 is added to the weight of the n-link NL1 corresponding to the node w0. The score of the node w1 is not added to the weight of the n-link NL2 corresponding to the node w1, and a score of 1 is added to the weights of the n-links NL3 to NL7 corresponding to the nodes w2 to w6 and the weight of the t-link TL corresponding to the node w7. Accordingly, the weights of the s-link SL, the n-links NL1 to NL7, and the t-link TL are (2, 1, 1, 2, 2, 2, 2, 2, 2).

Next, since the score of the node w2 is 0, no weight is added to the s-link SL, the n-links NL1 to NL7, and the t-link TL. Accordingly, the weights of the s-link SL, the n-links NL1 to NL7, and the t-link TL are (2, 1, 1, 2, 2, 2, 2, 2, 2).

Hereinafter, similarly, by adding the scores for all the nodes to the weights of the links other than the corresponding links, the weights of the s-link SL, the n-links NL1 to NL7, and the t-link TL are (2, 1, 1, 2, 2, 2, 2, 2, 2). Therefore, the weights of the n-links NL1 and NL2 are minimized.

Next, the setting of the weight of the link with respect to the thoracic spine will be described. FIG. 9 is a diagram illustrating the setting of the weight of the link with respect to the thoracic spine. Here, the information indicating that the key point is the thoracic spine as described above is (0, 1, 0, 0) for the cervical spine, the thoracic spine, the lumbar spine, and the ribs. Therefore, the scores of the nodes w0 to w7 are (0, 0, 1, 1, 1, 1, 0, 0).

Since the score of the first node w0 is 0, no weight is added to the s-link SL, the n-links NL1 to NL7, and the t-link TL. Accordingly, the weights of the s-link SL, the n-links NL1 to NL7, and the t-link TL are (0, 0, 0, 0, 0, 0, 0, 0, 0).

Since the score of the second node w1 is also 0, no weight is added to the s-link SL, the n-links NL1 to NL7, and the t-link TL. Accordingly, the weights of the s-link SL, the n-links NL1 to NL7, and the t-link TL are (0, 0, 0, 0, 0, 0, 0, 0, 0).

Since the score of the node w2 is 1, 1 is added to the weight of the s-link SL, and 1 of the score of the node w2 is added to the weights of the n-links NL1 and NL2 corresponding to the nodes w0 and w1. The score of the node w2 is not added to the weight of the n-link NL3 corresponding to the node w2, and a score of 1 is added to the weights of the n-links NL4 to NL7 corresponding to the nodes w3 to w6 and the weight of the t-link TL corresponding to the node w7. Accordingly, the weights of the s-link SL, the n-links NL1 to NL7, and the t-link TL are (1, 1, 1, 0, 1, 1, 1, 1, 1).

Hereinafter, similarly, by adding the scores for all the nodes to the weights of the links other than the corresponding links, the weights of the s-link SL, the n-links NL1 to NL7, and the t-link TL are (4, 4, 4, 3, 3, 3, 3, 4, 4). Therefore, the weights of the n-links NL3 to NL6 are minimized.

Similarly, in a case where the weights of the s-link SL, the n-links NL1 to NL7, and the t-link TL are set for the lumbar spine, the weights of the s-link SL, the n-links NL1 to NL7, and the t-link TL are (2, 2, 2, 2, 2, 2, 2, 1, 1). Therefore, the weights of the n-link NL7 and the t-link TL are minimized.

In addition, in the present embodiment, the analysis unit 24 sets a weight for restricting cutting such that the identical labels do not continue by applying the method described in JP2017-187824A. Ideally, the key points extracted by the first extraction unit 22 are extracted one by one corresponding to each vertebra. Therefore, ideally, it is possible to set a weight for restricting cutting such that two or more identical labels do not continue. On the other hand, in a case where a lesion such as a compression fracture is present, it is not always possible to extract key points in an ideal form, and a plurality of key points corresponding to one vertebra may be extracted. In consideration of such a case, a weight for restricting the cutting may be set so as to allow the identical label to be continuous by about 2 or 3 times. In any case, by applying the method described in JP2017-187824A, the cutting can be controlled such that the identical labels do not continue more than necessary. By integrating the links between the key points of each vertebra and the links between the key points of the ribs and the thoracic spine and determining the optimal cutting globally, it is possible to cover an extraction error of the key points that may occur locally. Hereinafter, in order to simplify the description, the analysis unit 24 sets a weight for restricting cutting such that two or more identical labels do not continue to each other with respect to the graph 47.

By setting the weight in this way, the analysis unit 24 can first cut the links at the n-links NL1 and NL2 shown in FIG. 7 for the cervical spine. In addition, for the thoracic spine, the analysis unit can cut the links at the n-links NL3, NL4, NL5, and NL6 shown in FIG. 7. In addition, for the lumbar spine, the analysis unit can cut the links at the n-link NL7 and the t-link TL shown in FIG. 7.

Therefore, in a case where the method according to the present disclosure is applied to the actual link structure of the vertebra shown in FIG. 6, for the cervical spine, the analysis unit 24 can cut links between the respective key points of the first cervical spine and the seventh cervical spine, a link between the key point of the seventh cervical spine and the key point of the first thoracic spine, links between the respective key points of the first thoracic spine to the twelfth thoracic spine, a link between the key point of the twelfth thoracic spine and the key point of the first lumbar spine, and links between the respective key points of the first lumbar spine to the fifth lumbar spine. Accordingly, for the vertebra, all the links between the key points adjacent to each other in the body axis direction are cut.

In addition, the analysis unit 24 associates a label with each key point according to the position of the cut link. For example, in the present embodiment, since the link between the key point of the seventh cervical spine and the key point of the first thoracic spine is cut, the analysis unit 24 associates the label of the seventh cervical spine C7 with the key point on the upper side of the cutting position in the body axis direction. Further, the labels of the sixth cervical spine C6, the fifth cervical spine C5, the fourth cervical spine C4, the third cervical spine C3, the second cervical spine C2, and the first cervical spine C1 are associated with the key points on the upper side of the seventh cervical spine C7 in the body axis direction. In addition, the label of the first thoracic spine T1 is associated with the key point on the lower side of the cutting position in the body axis direction. Then, the labels of the second thoracic spine T2 to the twelfth thoracic spine T12 are associated with each key point on the lower side in the body axis direction from the first thoracic spine T1.

In addition, in the present embodiment, since the link between the key point of the twelfth thoracic spine T12 and the key point of the first lumbar spine L1 is cut, the analysis unit 24 associates the label of the first lumbar spine L1 with the key point on the lower side of the cutting position in the body axis direction. Then, the labels of the second lumbar spine L2 to the fifth lumbar spine L5 are associated with each key point on the lower side in the body axis direction from the first lumbar spine L1.

Accordingly, the first cervical spine C1 to the seventh cervical spine C7, the first thoracic spine T1 to the twelfth thoracic spine T12, and the first lumbar spine L1 to the fifth lumbar spine L5 are labeled on the vertebrae.

Figure 10:
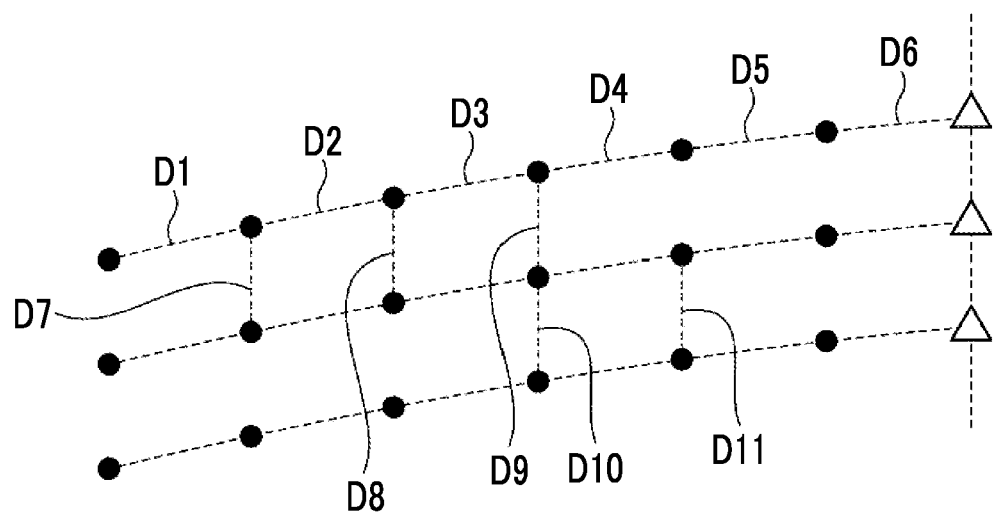
FIG. 10 is a diagram illustrating links to ribs.

On the other hand, for the ribs, the weights of the links between the adjacent thoracic spines are first set large for each of the left rib and the right rib. Further, a large weight is set for the link in the direction intersecting the body axis, and a small weight is set for the link in the body axis direction. FIG. 10 is a diagram illustrating links to the ribs. Note that FIG. 10 shows a link for the three ribs and a node of the thoracic bone to which the ribs are associated. As shown in FIG. 10, the key points of the uppermost rib are linked by links D1 to D5, and are linked to the thoracic spine by a link D6. Further, the uppermost rib and the second rib are linked by links D7 to D9, and the second rib and the third rib are linked by links D10 and D11. The analysis unit 24 sets a large weight for the links D1 to D6 and a small weight for the links D7 to D11.

Accordingly, the links of the left rib and the right rib are cut in the body axis direction, and the links are not cut in the direction intersecting the body axes. In addition, the link is not cut between the key points of the corresponding thoracic spines. Therefore, the left rib and the right rib can be separated into 12 pieces each. In addition, since each rib is associated with the thoracic spine, by assigning the same number as the number of the thoracic spine, the labels of the left first rib R1 to the left twelfth rib R12 and the right first rib R1 to the right twelfth rib R12 can associated.

The second extraction unit 25 extracts the labeled vertebrae and ribs from the target image G0. To this end, the second extraction unit 25 includes a semantic segmentation model (hereinafter referred to as a second SS model) 32 for region identification. In a case where the target image G0 and the key point map derived from the first extraction unit 22 are input, the second SS model 32 outputs an identification image in which the individual vertebrae, the left rib, and the right rib are identified.

The second SS model 32 is constructed by CNN. Examples of the CNN include U-Net and ResNet. Specifically, in a case where the target image G0 and the key point map are input, the second SS model 32 is constructed by machine learning a CNN such that the regions of the individual vertebrae included in the target image G0 are identified.

Figure 11:
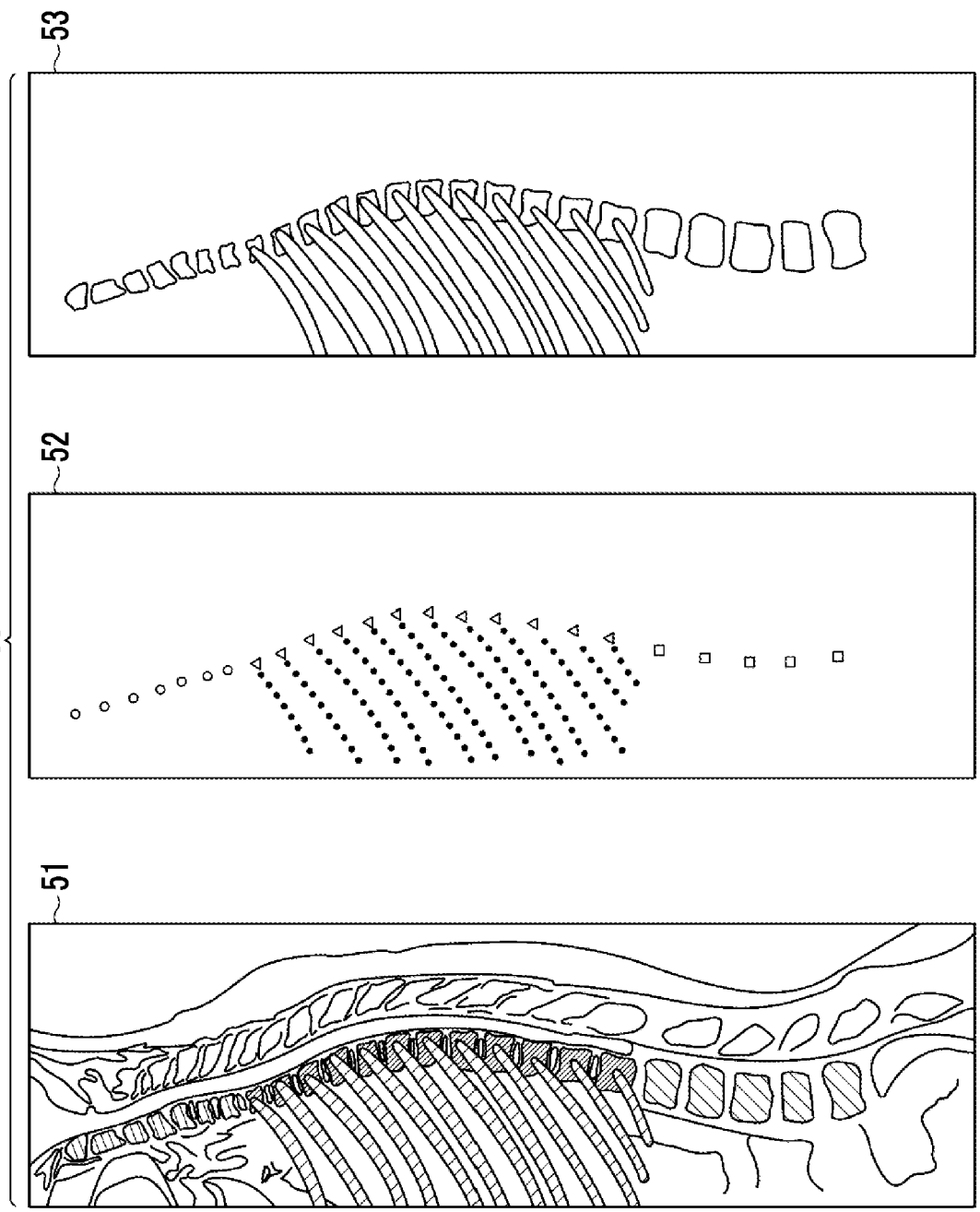
FIG. 11 is a diagram showing an example of training data for constructing a second SS model.

The second SS model 32 is trained with training data in the learning phase. FIG. 11 is a diagram showing an example of training data for constructing the second SS model. As shown in FIG. 11, training data 50 includes a training CT image 51, a training key point map 52, and correct answer data 53. The training CT image 51 is the same image as the training CT image 41 that trains the first SS model 30. The training key point map 52 is an image from which the key points of the vertebrae and the ribs in the training CT image 51 are extracted. The correct answer data 53 is an image in which the regions of the vertebra and the ribs in the training CT image 51 are specified.

At the time of learning, the training CT image 51 and the training key point map 52 are input to the second SS model 32. The second SS model 32 outputs a training probability distribution map for the training CT image 51. Also, the loss calculation of the second SS model 32 is performed based on the training probability distribution map and the correct answer data 53. Then, various coefficients of the second SS model 32 are updated according to the result of the loss calculation, and the second SS model 32 is updated according to the updated setting.

At the time of training the second SS model 32, a series of processes of the input of the training CT image 51 to the second SS model 32, the output of the training probability distribution map from the second SS model 32, the loss calculation, the update setting, and the update of the second SS model 32 are repeatedly performed while the training data 50 is exchanged. The repetition of the series of processes ends in a case where the prediction accuracy of the training probability distribution map for the correct answer data 53 reaches a predetermined set level. The second SS model 32 whose prediction accuracy has reached the set level in this manner is stored in the storage 13 and used in the second extraction unit 25.

The identification image extracted by the second extraction unit 25 by inputting the target image G0 will be described later.

Figure 12:
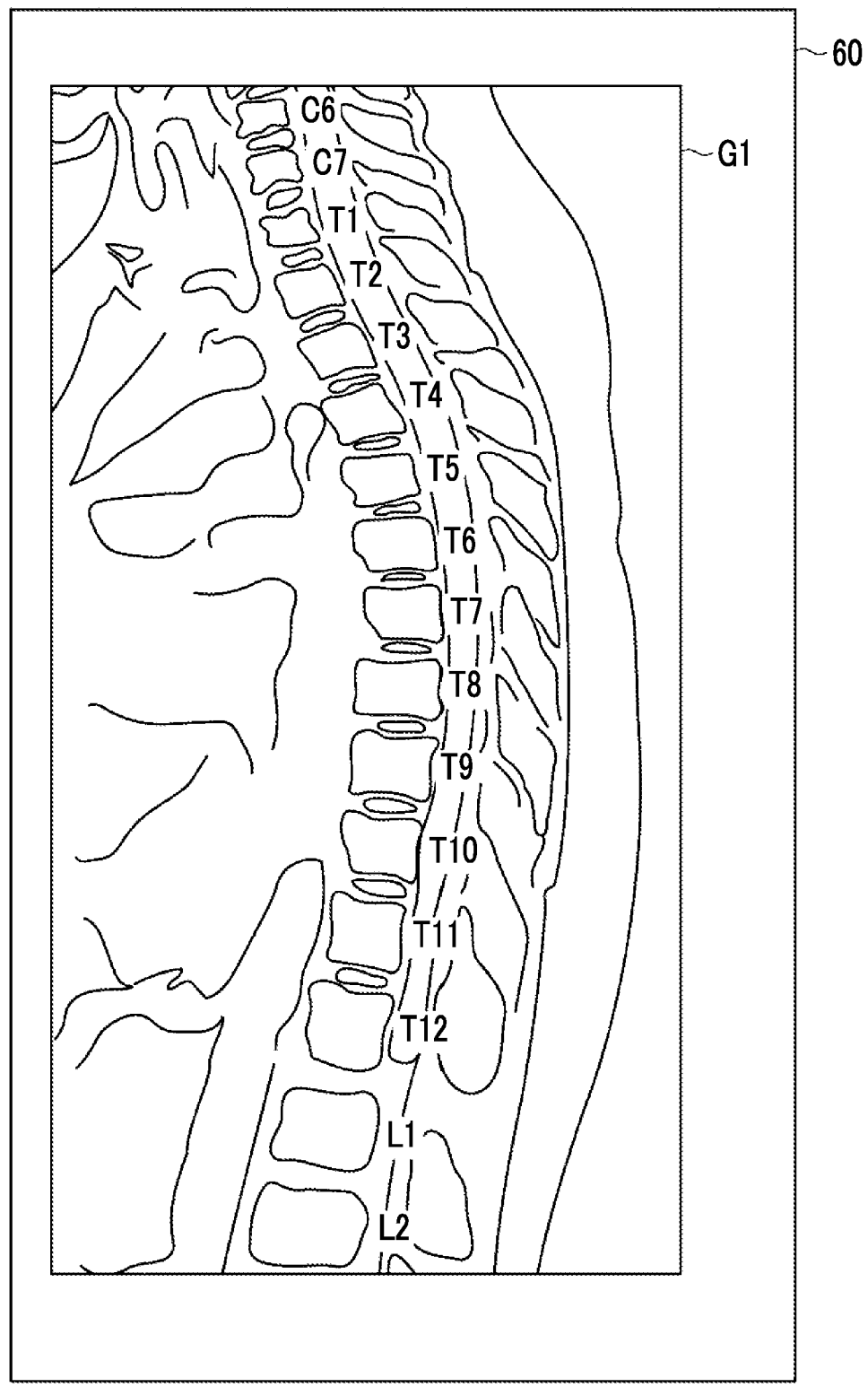
FIG. 12 is a diagram showing a display screen of a labeling result for vertebrae.

The display controller 26 displays the labeling result together with the identification image. FIG. 12 is a diagram showing a display screen of a labeling result for vertebrae. As shown in FIG. 12, a display screen 60 displays an identification image G1 about the vertebra. The identification image G1 is a tomographic image of a sagittal cross section of a human body, and a labeling result is associated with each of the vertebrae extracted by the second extraction unit 25 and displayed. In addition, since the identification image G1 shown in FIG. 12 includes the sixth cervical spine C6, the seventh cervical spine C7, the first to twelfth thoracic spines T1 to T12, the first lumbar spine L1, and the second lumbar spine L2, labels given to the respective vertebrae are displayed. In addition, the color of each label may be different. In this case, the vertebra may be given the same color as the label. In addition, the key points detected in the vertebrae may be displayed in the same color as the label.

Figure 13:
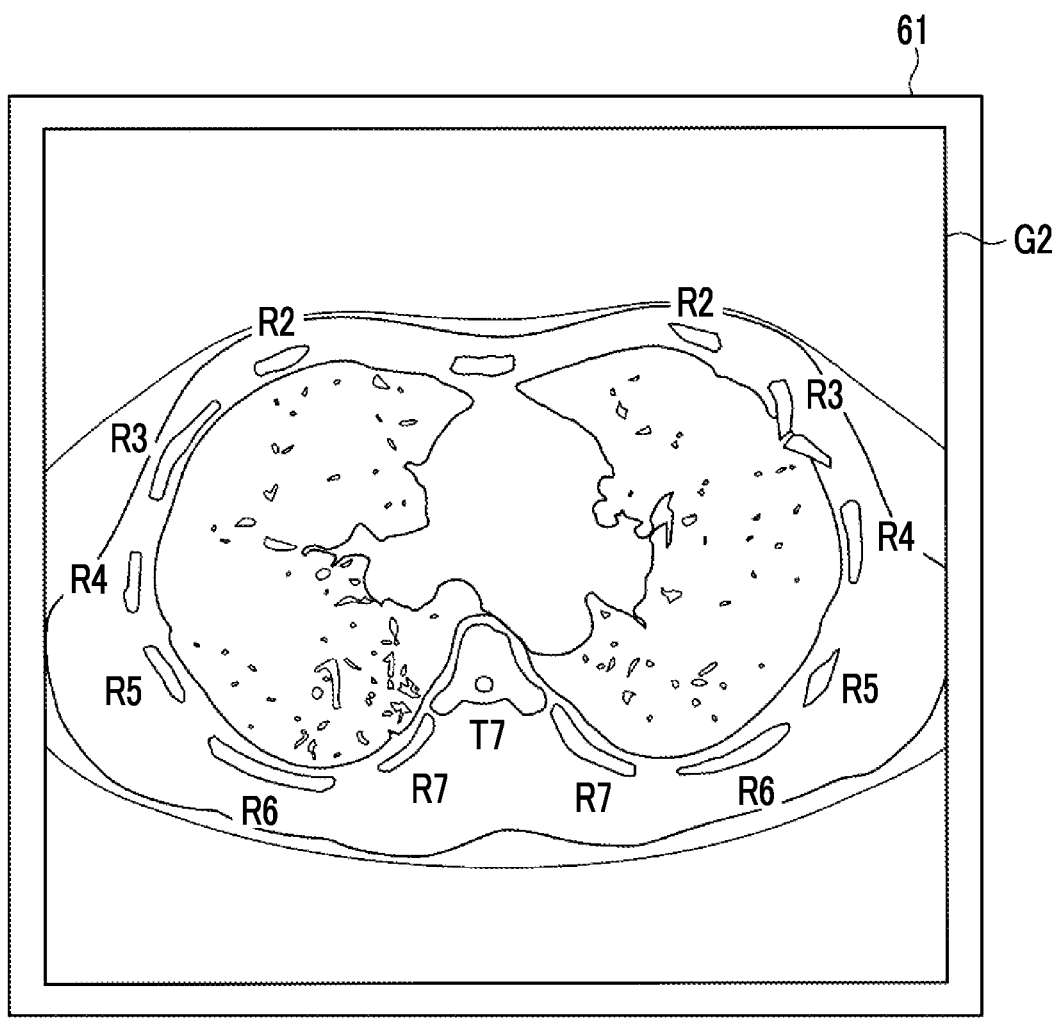
FIG. 13 is a diagram showing a display screen of a labeling result for ribs.

FIG. 13 is a diagram showing a display screen of a labeling result for ribs. As shown in FIG. 13, a display screen 61 displays an identification image G2. The identification image G2 is a tomographic image of an axial cross section of a human body, and a labeling result is associated with each of the ribs extracted by the second extraction unit 25 and displayed. In the identification image G2 shown in FIG. 13, the seventh thoracic spine T7 and the left and right seventh ribs R7 to the left and right second ribs R2 are displayed. In the identification image G2 of the ribs, the color of each label may be different, or the same color as the label may be given to the vertebrae and the ribs. In addition, the key points detected in the vertebrae and the ribs may be displayed in the same color as the label.

Figure 14:
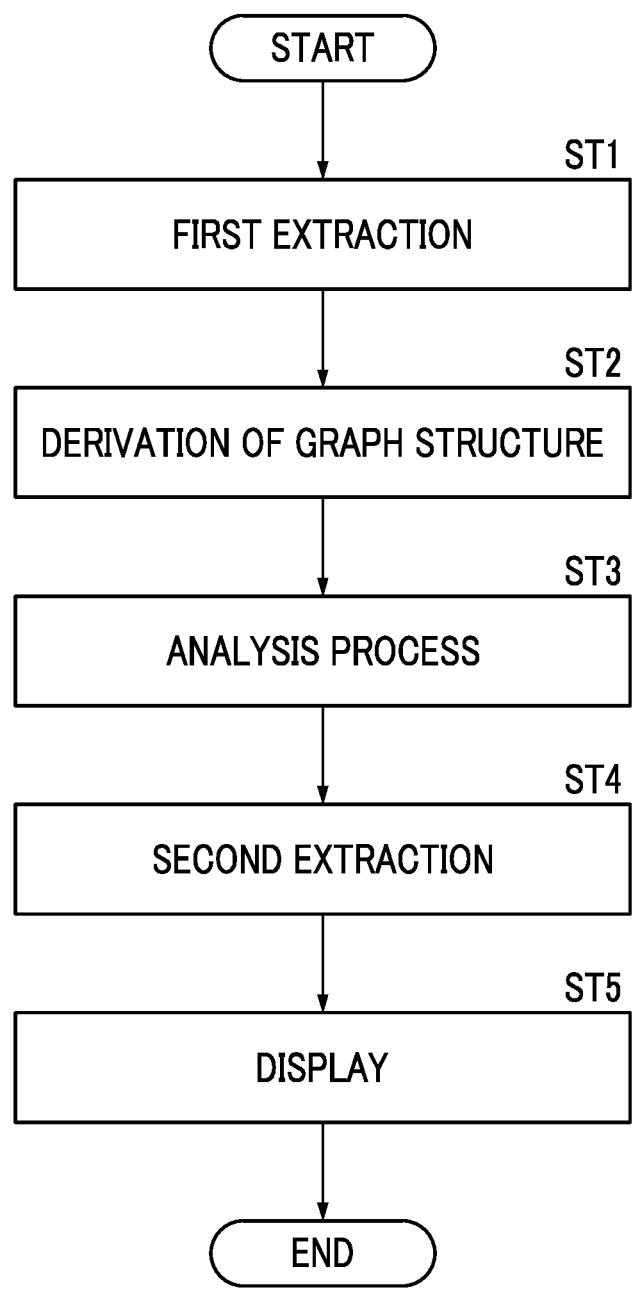
FIG. 14 is a flowchart showing a process performed in the present embodiment.

Next, a process performed in the present embodiment will be described. FIG. 14 is a flowchart showing a process performed in the present embodiment. It is assumed that the target image G0 is acquired from the image storage server 3 and is saved in the storage 13. First, the first extraction unit 22 extracts the key point from the target image G0 in association with the label of the first layer (first extraction; Step ST1). Next, the first extraction unit 22 uses the key points extracted from the target image G0 as nodes to derive a graph structure in which the label of the key points and the node are associated with each other (Step ST2). Next, the analysis unit 24 analyzes the graph structure derived by the graph structure derivation unit 23 to associate the nodes in the graph structure with the labels of the second layer lower than the first layer (analysis process; Step ST3). Subsequently, the second extraction unit 25 extracts the vertebrae and ribs associated with the labels from the target image G0 (second extraction; Step ST4). Then, the display controller 26 displays the labeling result (Step ST5), and the process ends.

As described above, in the present embodiment, key points of the vertebrae and the ribs included in the target image G0 are extracted in association with labels of a first layer, the key points are used as nodes to derive a graph structure in which the labels of the first layer are associated with the nodes, and the nodes are associated with labels of a second layer lower than the first layer by analyzing the graph structure. Therefore, a plurality of structures such as the vertebrae and the ribs included in the target image G0 can be labeled with high accuracy.

In addition, in the above-described embodiment, in a case where labeling is performed on individual vertebrae included in the cervical spine, the thoracic spine, and the lumbar spine, the analysis unit 24 may set a score that reflects the relative relationship with other vertebrae at the boundaries of the cervical spine and the thoracic spine, and the lumbar spine. For example, in a case of labeling the thoracic spine, at the boundary between the cervical spine and the thoracic spine, the score of the key point of the cervical spine adjacent to the thoracic spine may be set to 1, and the score of the key point of the thoracic spine adjacent to the cervical spine may be set to 10. In addition to this, any known method for graph cutting, such as setting a score in consideration of features around each key point, can be applied.

Further, in the above-described embodiment, the analysis unit 24 determines the link to be cut in the graph structure by the graph cut method, but the present disclosure is not limited thereto. By predicting the class to which the node in the graph structure belongs by using a graph convolutional neural network (GCN) for analyzing the graph structure, the graph structure may be associated with the labels of the second layer lower than the first layer.

Figure 15:
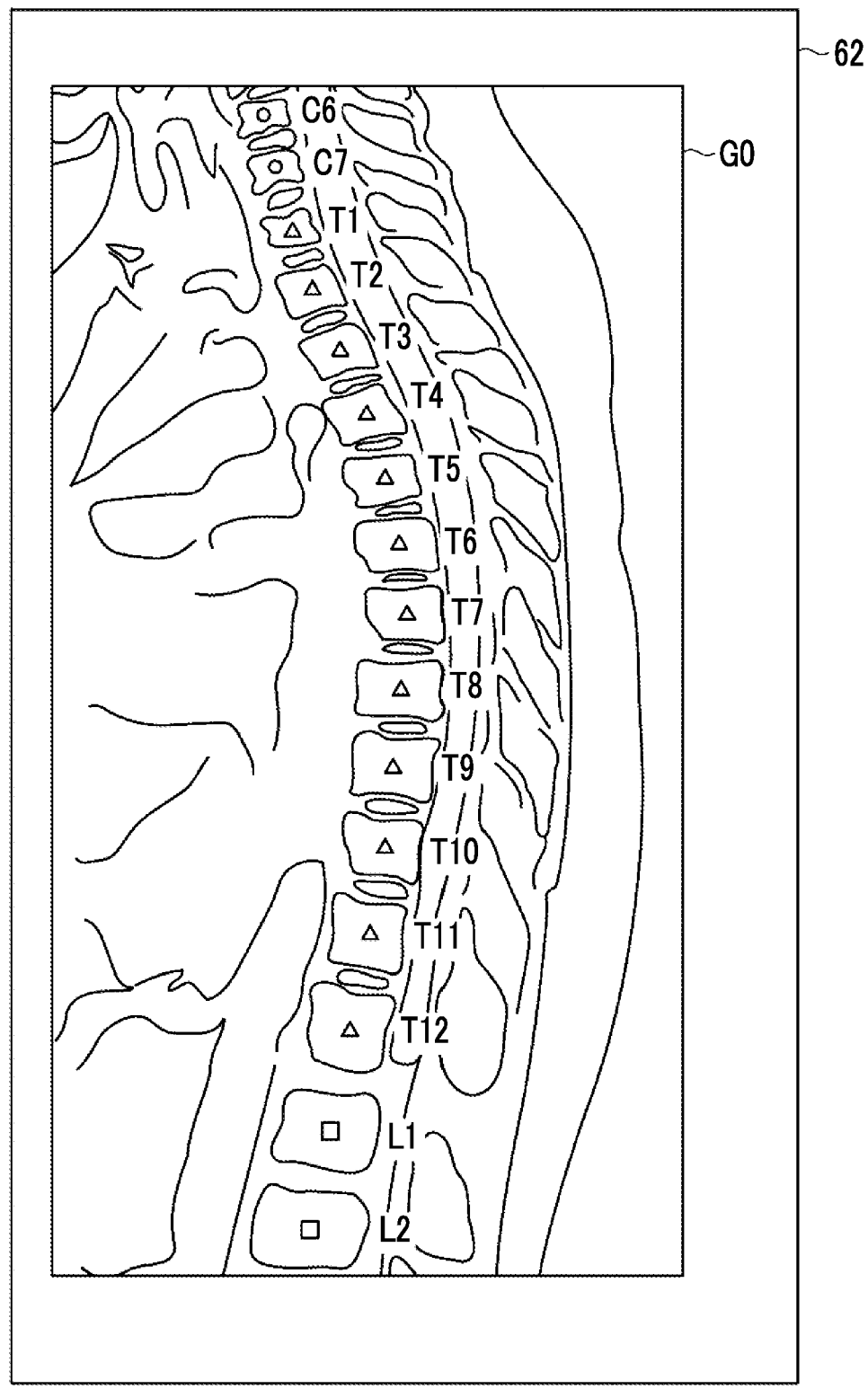
FIG. 15 is a diagram showing another example of a display screen of a labeling result for vertebrae.

Further, in the above-described embodiment, the display controller 26 displays the identification images G1 and G2 and the labeling result after the second extraction unit 25 extracts the vertebrae and rib regions, but the present disclosure is not limited thereto. At a point in time in which the analysis unit 24 associates the nodes in the graph structure with the labels of the second layer, the key point map may be superimposed and displayed on the target image G0, and the labeling result may be given to the superimposed and displayed image. FIG. 15 shows a display screen of the labeling result for the vertebrae displayed in this case. In FIG. 15, the target image G0 on which the key points are superimposed is displayed on a display screen 62.

Further, in the above-described embodiment, the second extraction unit 25 is provided, but the present disclosure is not limited thereto. The second extraction unit 25 may not be provided. In this case, the labeling result may be displayed on the target image G0 in which the key points are superimposed and displayed, as shown in FIG. 15, without extracting the vertebrae and the ribs from the target image G0.

Further, in the above-described embodiment, labeling of the cervical spine, the thoracic spine, the lumbar spine, and the ribs is performed, but the labeling is not limited thereto. Labeling may be performed only for each of the cervical spine, the thoracic spine, the lumbar spine, and the ribs. In addition, labeling may be performed only for a combination of two or more of the cervical spine, the thoracic spine, the lumbar spine, and the ribs.

Further, in the above embodiment, for example, as hardware structures of processing units that execute various kinds of processing, such as the image acquisition unit 21, the first extraction unit 22, the graph structure derivation unit 23, the analysis unit 24, the second extraction unit 25, and the display controller 26, various processors shown below can be used. As described above, the various processors include a programmable logic device (PLD) as a processor of which the circuit configuration can be changed after manufacture, such as a field programmable gate array (FPGA), a dedicated electrical circuit as a processor having a dedicated circuit configuration for executing specific processing such as an application specific integrated circuit (ASIC), and the like, in addition to the CPU as a general-purpose processor that functions as various processing units by executing software (programs).

One processing unit may be configured by one of the various processors, or may be configured by a combination of the same or different kinds of two or more processors (for example, a combination of a plurality of FPGAs or a combination of the CPU and the FPGA). In addition, a plurality of processing units may be configured by one processor.

As an example where a plurality of processing units are configured by one processor, first, there is a form in which one processor is configured by a combination of one or more CPUs and software as typified by a computer, such as a client or a server, and this processor functions as a plurality of processing units. Second, there is a form in which a processor for realizing the function of the entire system including a plurality of processing units via one integrated circuit (IC) chip as typified by a system on chip (SoC) or the like is used. In this way, various processing units are configured by using one or more of the above-described various processors as hardware structures.

Furthermore, as the hardware structure of the various processors, more specifically, an electrical circuit (circuitry) in which circuit elements such as semiconductor elements are combined can be used.

What is claimed is:

1. An image processing apparatus comprising at least one processor,
wherein the processor is configured to:
extract, from an image including a plurality of structures that spatially continuously present and whose corresponding labels have a hierarchy, respective key points of the plurality of structures in association with labels of a first layer;
use the key points as nodes to derive a graph structure in which the labels of the first layer are associated with the nodes; and
perform graph cut processing on the graph structure to associate the nodes with labels of a second layer lower than the first layer,
wherein the plurality of structures include a plurality of vertebrae,
wherein the labels of the first layer are at least one of a cervical spine, a thoracic spine, or a lumbar spine, and
wherein the labels of the second layer are labels for identifying individual bones in at least one of the cervical spine, the thoracic spine, or the lumbar spine.

2. The image processing apparatus according to claim 1, wherein the plurality of structures include a plurality of ribs,
the labels of the first layer are the ribs, and
the labels of the second layer are labels for identifying the individual ribs.

3. The image processing apparatus according to claim 2, wherein the labels of the second layer are labels for identifying a left first rib to a left twelfth rib and a right first rib to a right twelfth rib.

4. The image processing apparatus according to claim 1, wherein the processor is configured to perform graph cut processing on the graph structure such that a link to be cut in the graph structure is determined by a graph cut method and the labels of the second layer to be associated with the respective nodes are determined.

5. The image processing apparatus according to claim 1, wherein the processor is configured to extract the plurality of structures associated with the labels of the second layer from the image.

6. The image processing apparatus according to claim 5, wherein the processor is configured to display the plurality of extracted structures in association with the labels of the second layer.

7. The image processing apparatus according to claim 1, wherein the processor is configured to display the labels of the second layer on the image.

8. An image processing method comprising:
extracting, from an image including a plurality of structures that spatially continuously present and whose corresponding labels have a hierarchy, respective key points of the plurality of structures in association with labels of a first layer;
using the key points as nodes to derive a graph structure in which the labels of the first layer are associated with the nodes; and
performing graph cut processing on the graph structure to associate the nodes with labels of a second layer lower than the first layer by analyzing the graph structure,
wherein the plurality of structures include a plurality of vertebrae,
wherein the labels of the first layer are at least one of a cervical spine, a thoracic spine, or a lumbar spine, and
wherein the labels of the second layer are labels for identifying individual bones in at least one of the cervical spine, the thoracic spine, or the lumbar spine.

9. A non-transitory computer-readable storage medium that stores an image processing program causing a computer to execute:
a procedure of extracting, from an image including a plurality of structures that spatially continuously present and whose corresponding labels have a hierarchy, respective key points of the plurality of structures in association with labels of a first layer;
a procedure of using the key points as nodes to derive a graph structure in which the labels of the first layer are associated with the nodes; and
a procedure of performing graph cut processing on the graph structure to associate the nodes with labels of a second layer lower than the first layer by analyzing the graph structure,
wherein the plurality of structures include a plurality of vertebrae, wherein the labels of the first layer are at least one of a cervical spine, a thoracic spine, or a lumbar spine, and
wherein the labels of the second layer are labels for identifying individual bones in at least one of the cervical spine, the thoracic spine, or the lumbar spine.

* * * * *